United States Patent [19]

Kast

[11] Patent Number: 4,805,515
[45] Date of Patent: Feb. 21, 1989

[54] FAIL-SAFE SERVOVALVE SYSTEM

[75] Inventor: Howard B. Kast, Fairfield, Ohio

[73] Assignee: General Electric Company, Cincinnati, Ohio

[21] Appl. No.: 718,321

[22] Filed: Apr. 1, 1985

Related U.S. Application Data

[62] Division of Ser. No. 553,336, Nov. 18, 1983, Pat. No. 4,538,504.

[51] Int. Cl.[4] .......................... F15B 13/02; F15B 15/17
[52] U.S. Cl. .......................................... 91/461; 91/509; 91/3
[58] Field of Search ...................... 91/3, 509, 510, 453, 91/367, 461

[56] References Cited

U.S. PATENT DOCUMENTS

| 3,257,911 | 6/1966 | Garnjost et al. | 91/509 |
|---|---|---|---|
| 3,488,029 | 11/1970 | Durbin | 91/509 |
| 3,789,736 | 2/1974 | Williams | 91/3 |
| 4,143,583 | 3/1979 | Baur et al. | 91/509 |
| 4,155,288 | 5/1979 | Glaze | 91/510 |
| 4,276,809 | 7/1981 | Kast | 91/3 |
| 4,470,337 | 9/1984 | Kast | 91/3 |
| 4,538,504 | 9/1985 | Kast | 91/3 |

Primary Examiner—Raymond A. Nelli
Attorney, Agent, or Firm—Derek P. Lawrence; Nathan D. Herkamp

[57] ABSTRACT

In one form of the present invention, a plurality of serovalves are connected to a common manifold. The manifold transmits fluid pressure from the servovalves to a modulator piston which controls the fluid pressure applied to a hydraulic actuator piston. The servovalves are designed such that, if the fluid pressure provided by any one of them to the manifold falls below a threshold, then the servovalve disconnects itself from the manifold, allowing control of the modulator piston to be assumed by the remaining, functioning servovalves. The present invention can be used in control surface actuators of short takeoff and landing (STOL) aircraft.

4 Claims, 3 Drawing Sheets

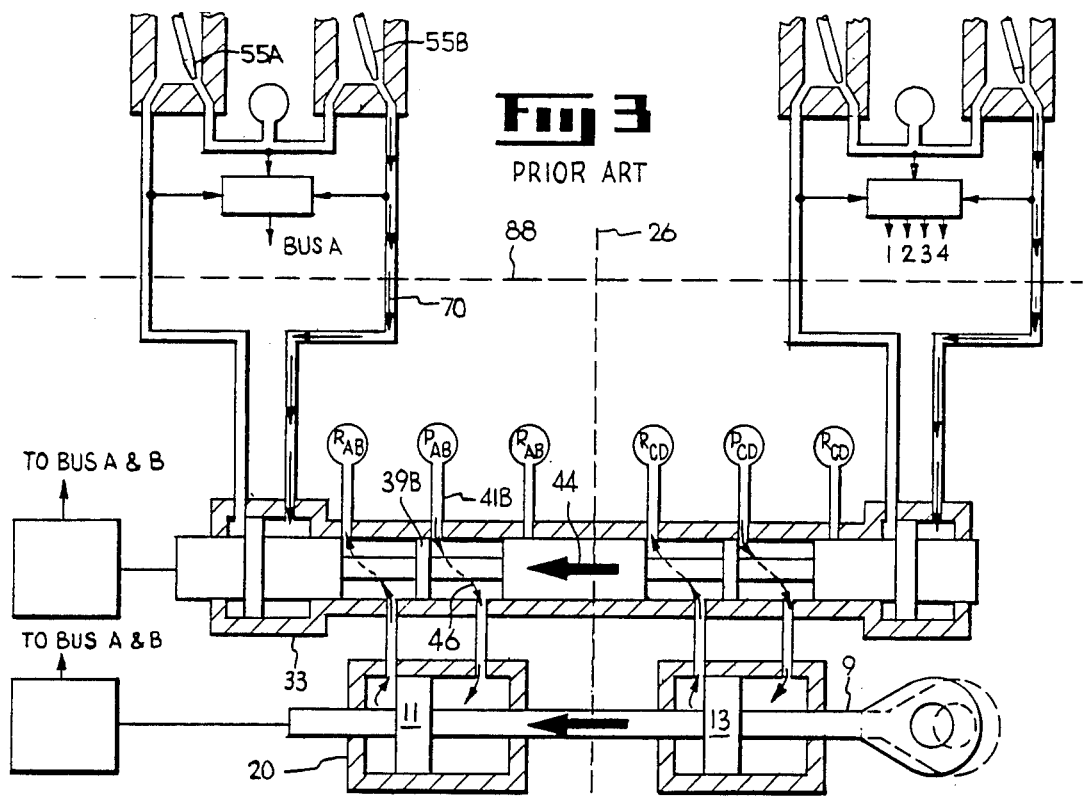
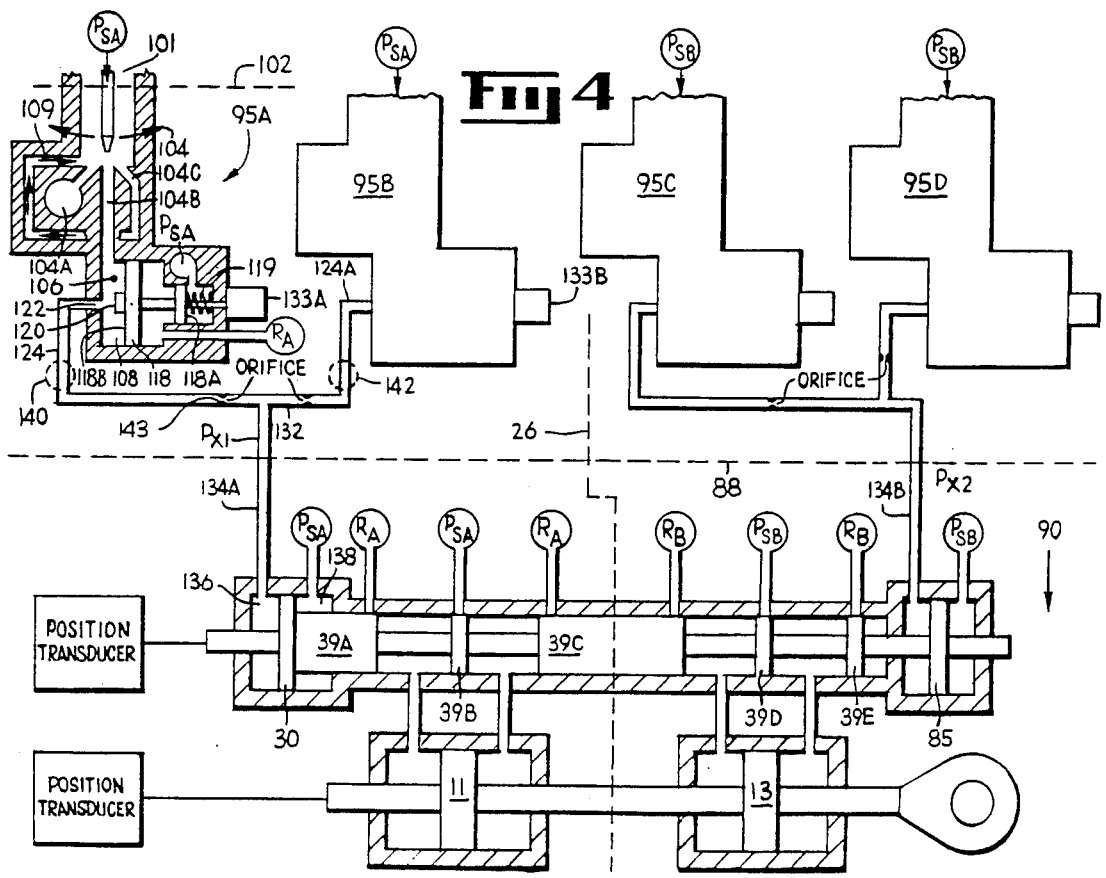

FAIL-SAFE SERVOVALVE SYSTEM

The invention relates to servovalve systems and, more particularly, to the multiple redundancy aspects and fail-fixed aspects of such systems.

BACKGROUND OF THE INVENTION

This is a division of application Ser. No. 553,336, filed Nov. 18, 1983, now U.S. Pat. No. 4,538,504.

FIG. 1 illustrates a variable geometry nozzle 3 which modulates the high velocity gases passing through it, as in the propulsion system of a jet aircraft 6. Such nozzles are commonly activated by hydraulic pistons, commonly called rams (not shown in FIG. 1), which are powered by pressurized hydraulic fluid. A system of servovalves commonly controls delivery of hydraulic fluid to the rams. A schematic of one system now in use is shown in FIGS. 2 and 3.

The fundamental goal of the system shown in those figures is to move an actuating arm 9, which is fastened to rams 11 and 13, to known, selectable positions along an axis 16. Motion of the arm 9 is achieved by application of hydraulic fluid through conduits 18A-D into cylinders 20 and 22 to move rams 11 and 13. The position of the arm 9 along the axis 16 is detected by a position sensor 24. The components on the left of dashed line 26 in FIGS. 2 and 3 form generally a mirror image of those to the right of this dashed line. The functioning of the former will be described, with the understanding that the functioning of the latter is analogous, and both together control the position and motion of rams 11 and 13.

A master control valve 27 includes a modulator piston 30 contained within a cylinder 33. The piston moves left and right under the influence of hydraulic fluid applied by conduits 36 and 38. As the modulator piston 30 moves left and right, spools 39A-C either cover or uncover conduits 41A-C. These conduits are respectively connected to a return manifold designated $R_{AB}$, a pressure manifold designated $P_{AB}$, and the aforementioned return manifold $R_{AB}$. An example of master control valve motion is shown in FIG. 3. As the modulator piston 30 is moved leftward, in the direction of arrow 44, the spool 39B is also moved, uncovering conduit 41B, thus allowing hydraulic fluid indicated by arrows 46 to flow from the pressure manifold $P_{AB}$ along conduit 41B and into cylinder 20, thus pushing ram 11 to the left. This action moves the actuator arm 9 leftward also, since the arm 9 is attached to the ram 11.

The hydraulic fluid applied to the modulator piston 30 is controlled as follows. A pressure reservoir $P_{SAB}$ in FIG. 2 supplies pressurized fluid to each of servovalves 50A and 50B through conduits 51 and 52. One type of servovalve which can be used is that described in U.S. Pat. No. 4,276,809, invented by the Applicant. Each valve 50A and B contains respectively a movable jet pipe 55A and B which selectively directs a stream of pressurized fluid (not shown) to respective receiver conduits 58A-D. As described in the patent just identified, the pressures in the conduits 58A-D depend upon the relative positions of the jet pipes 55 with respect to receiver conduits 58A-D.

The jet pipes 55 are rotated by means of a torque motor 60. Coils 62A-D produce a magnetic field which reacts with the magnetic field produced by permanent magnets 64A and B to thereby generate a moment about point 68, thus bending the jet pipes 55A and B as shown in FIG. 3. The amount of fluid pressure reaching the cylinder 33 depends upon the amount of bending of the jet pipe 55B. This fluid pressure 70 drives the modulator piston 30 to the left, thus moving the spools 39A-C as shown to admit fluid pressure 46 into cylinder 20 to move the ram 11 as described above.

External circuitry (not shown) coordinates the electric current applied to coils 62A-D of 50A-B in FIG. 2 in response to signals produced by sensors 24 and 24A to appropriately rotate the jet pipes 55A-B so that the proper pressures are applied conduits 58A-D in order to move the modulator piston 30 in the desired direction, at the desired speed, and in the desired amount.

Only one of each position sensors 24 and 24A is shown in FIG. 2. This is for ease of illustration only. It is to be understood that the driving circuitry (not shown) for each servovalve 95 in Figure 4 has its own position sensor, so that the two servovalves 95A and 95B each have one position transducer for the modulator piston and one transducer for the ram piston, for a total of four transducers.

A monitor 75 monitors the pressure at point 76 in a manifold 78 which is connected to the receiver conduits 58B-C of each of servovalves 50A and B in FIG. 2. The monitor 75 also monitors the pressures in conduits 36 and 38 at points 80 and 81. The monitor 75 compares these three pressures and if they deviate from a predetermined schedule of pressures, a fault in the servovalve is assumed to have occurred, and the monitor 75 disconnects power from a solenoid 82 by means of a signal which the monitor 75 supplies to Bus A, thereby disconnecting the pressure source $P_{SAB}$ from the jet pipes 55A-B. Thus, no pressure is applied to conduits 36 and 38 and the movement of the master control valve 27 is then undertaken solely by the valve system to the right of the dashed line 26. This second valve system to the right of dashed line 26 is identical to that on the left, as stated above. This second valve system controls the modulator piston 85 which drives the master control valve 27 which, in turn, controls ram 13.

The system shown in FIGS. 2 and 3, while having many desirable characteristics, can have disadvantages in some aircraft applications. For example, in aircraft in the category designated short takeoff and landing (STOL), the thrust of the engine is vectored up-, down-, left-, right-, forward and rearward by mechanisms which are actuated by systems resembling those of FIGS. 2 and 3. This STOL application can require as many as eleven such actuation systems. Given that the components located above dashed line 88 in FIG. 3 can weigh 35 lbs and can cost many tens of thousands of dollars, the requirement of eleven such systems clearly imposes a cost and weight penalty.

In addition, if the monitor 75 detects an improper pressure differential, as for example caused by a malfunction of servovalve 50A, the system removes both valves 50A and B from operation, irrespective of the possibility that one of them may still be functional.

OBJECTS OF THE INVENTION

It is an object of the present invention to provide a new and improved hydraulic actuator system.

It is a further object of the present invention to provide a new and improved hydraulic actuator system in which the malfunction of one component does not necessitate the inactivation of other, correctly functioning components.

It is further object of the present invention to provide a hydraulic actuator system of lighter weight and lower cost and having fewer components than present designs.

SUMMARY OF THE INVENTION

One form of the invention comprises a plurality of servovalves, each having an output which supplies fluid pressure to a common manifold. The manifold, in turn, supplies pressure to a piston which activates a master control valve for modulating aircraft control surfaces, as in STOL aircraft thrust vectoring systems. Each servovalve contains a shuttle piston which functions to block its output when supply pressure to the valve or the valve itself fails. The system in effect disconnects each faulty valve from the manifold automatically, allowing the remaining valves to control the master control valve.

BRIEF DESCRIPTION OF THE DRAWINGS

FIG. 3 illustrates the operation of the actuator of FIG. 2.

FIG. 4 illustrates one form of the present invention.

DETAILED DESCRIPTION OF THE INVENTION

Figure 1:
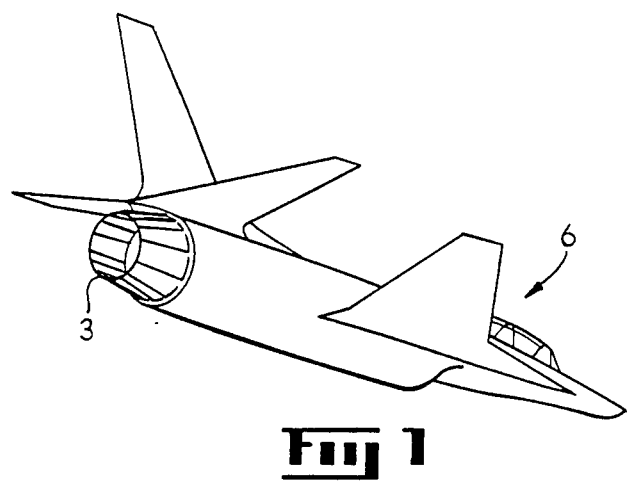
FIG. 1 illustrates a variable nozzle in a jet aircraft.

FIG. 4 illustrates one form of the present invention used for driving modulator pistons 30 and 85 which in turn drive the spools 39A-E which control the application of hydraulic fluid to rams 11 and 13. With the exception of pressure source $P_{SA}$ which is shown supplying rod cavity 138, the components of FIG. 4 located below dashed line 88, that is, in the direction of arrow 90, are considered known in the art and their functioning has been described in the Background of the Invention.

FIG. 4 illustrates four single-staged fail-fixed servovalves 95A-D, one of which is shown in schematic detail, namely valve 95A. One such valve which may be used is that described in U.S. Pat. No. 4,276,809 issued to Applicant July 7, 1981. Another such valve is that described in U.S. patent application, Ser. No. 395,569, filed July 6, 1982, by Applicant. Both this patent and this patent application are hereby incorporated by reference.

It is now assumed that servovalve 95A is that described in the above-identified Application, and the functioning of this valve will now be described. Hydraulic fluid under pressure is supplied from a source of pressure $P_{SA}$ to a jet pipe 101. The functioning of the components of the servovalve 95A located above dashed line 102 is described in the above-identified patent application. It is considered sufficient here to observe that the jet pipe 101 rotates as shown by arrows 104 in response to the current supplied to coils analogous to coils 62A-D in FIG. 2 to selectively allocate a jet of hydraulic fluid (jet not shown) among the receiver conduits 104A-C in FIG. 4.

Figure 5:
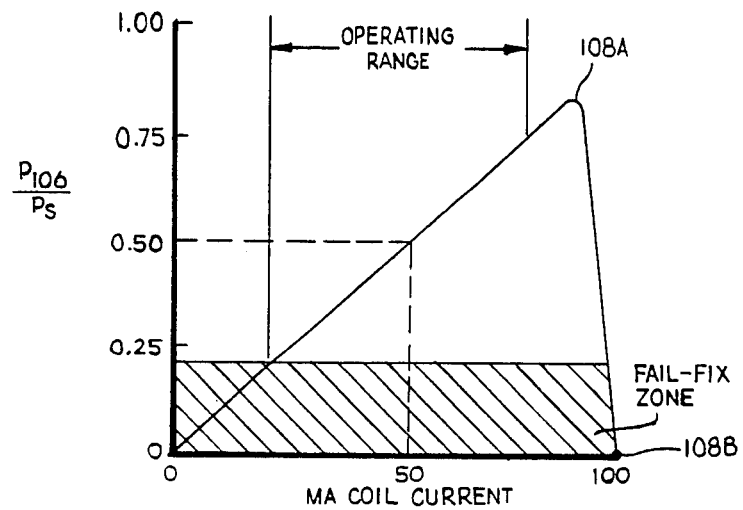
FIG. 5 illustrates the transfer function of the servovalve 95A in FIG. 4.
Figure 6:
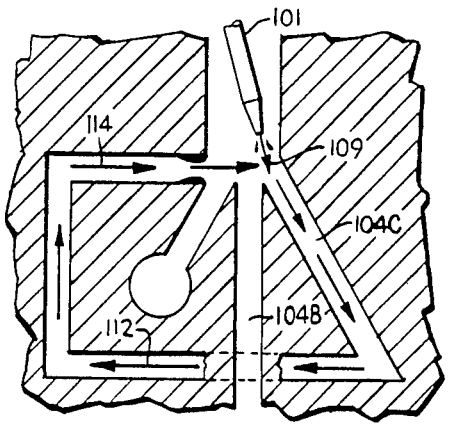
FIG. 6 illustrates details of the fluid paths of the servovalve.

The transfer function of servovalve 95A, namely the ratio ($P_x$) of fluid pressure at point 106 (i.e., $P_{106}$) in a shuttle piston cavity 108, over $P_S$, the pressure of the fluid source (i.e., $P_x = P_{106}/P_S$), is plotted in FIG. 5 as a function of the current passing through the coils. The drop off in $P_x$ occurring at point 108A in FIG. 5 results chiefly from the positive feedback action occurring when a fluid jet 109 in FIG. 6 supplied by jet pipe 101 enters a feedback receiver conduit 104C and is directed along path 112 and squirted as jet 114 which intersects the first jet 109, thereby further inducing the first jet 109 to travel in the feedback receiver conduit 104C rather than along the conduit 104B. That is, the tendency of the first jet 109 to flow along conduit 104B and into the shuttle piston cavity 108 in FIG. 4 is thereby reduced or inhibited.

When the pressure $P_{106}$ applied to the shuttle piston 118 in FIG. 4 is within the operating range illustrating in FIG. 5, the shuttle piston 118 is urged rightward despite the application of source pressure $P_{SA}$ through second cavity 119 to surface 118A of the shuttle, which tends to urge the shuttle piston leftward. This is so because the area of surface 118B (on the left) is greater than that of area 118A (on the right). Under these circumstances, a seal 120, attached to the shuttle piston 118, is separated from the opening or aperture 122 of outlet conduit 124. Fluid pressure accordingly travels from $P_{SA}$ (at the top servovalve 95A), through the jet pipe 101, along receiver conduit 104B, into aperture 122, along outlet conduit 124, and into a manifold 132.

If $P_x$ should run out of the operating range and reach point 108B in FIG. 5, the shuttle piston 118 is urged leftward by the influence of $P_{SA}$ in the second cavity 119 and the seal 120 engages the aperture 122, thereby trapping the fluid within outlet conduit 124 and manifold 132. Fluid flow into and out of conduit 124 is thereby inhibited. Conduit 124 has an orifice 143 of about one-half the area of the receiver conduit 104B. This allows $P_{106}$ to drop even if the modulator piston 30 moves leftward after a failure. The orifice also isolates $P_{106}$ from the output of the second servovalve 95B.

A second servovalve 95B identical to servovalve 95A is similarly connected through its output conduit 124A to the manifold 132. The manifold 132 is connected by a conduit 134A to the piston cavity 136 of a first modulator piston 30. The pressure source $P_{SA}$ is connected to the rod cavity 138.

The fixed-fail aspects of this arrangement will now be discussed. When $P_x$ falls outside the operating range of FIG. 5 so that the shuttle piston 118 seals off the aperture 122, this event, in effect, disconnects the first servovalve from the system. The effect is tantamount to closing a valve 140 (shown in phantom) so that second servovalve 95B now supplies all of the pressurized fluid to manifold 132 for operation of modulator piston 30. This is in contrast to the operation described in connection with FIGS. 2 and 3 in which the failure of servovalve 50A induced the removal of both itself and servovalve 50B, resulting in zero hydraulic fluid being applied to modulator piston 30. Thus, in the present invention, greater effective redundancy is obtained from a pair of servovalves than in the system shown in FIG. 2.

Figure 2:
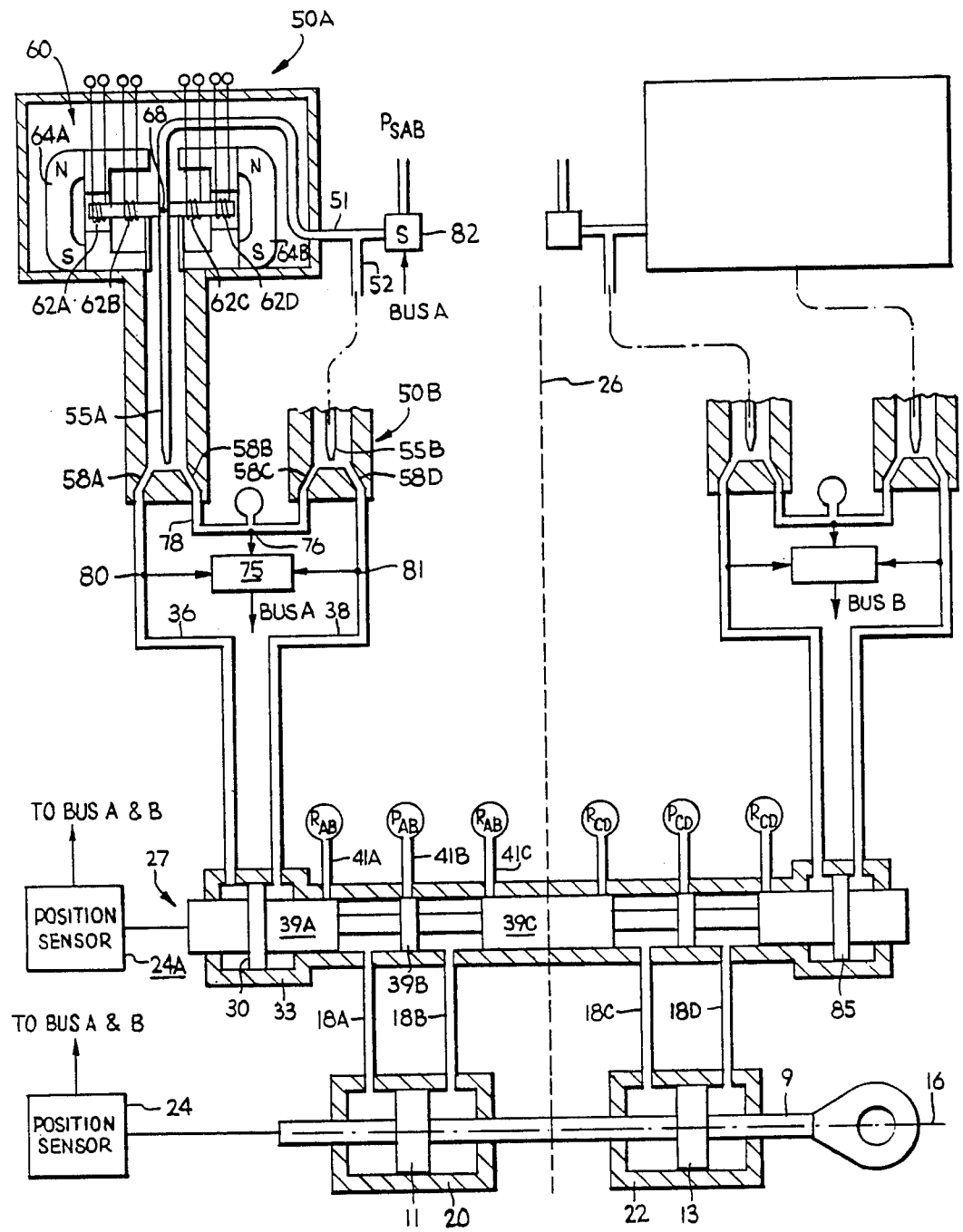
FIG. 2 illustrates a hydromechanical actuator in the prior art.

Further, the present invention eliminates the need for both monitor 75 in FIG. 2 and solenoid 82. The present invention of FIG. 4 compares the pressure $P_{106}$ and $P_{SA}$ by means of the relative geometries of surfaces 118A and B of shuttle piston 118. If the net force on surface 118A is greater than that on surface 118B, the seal 120 closes aperture 122. The need for monitor 75 and solenoid valve 82 in FIG. 2 to accomplish an analogous function is eliminated. Further, the shuttle piston 118 itself, through seal 120, cuts off fluid pressure to output conduit 124 when necessary, thus eliminating the need for solenoid 82 in FIG. 2.

Characterized another way, the present invention includes two fluidically coupled pistons, namely the shuttle piston 118 in FIG. 4 and the modulator piston 30, and four cavities, namely 108, 119, 136, and 138, defined by the piston. A first pressure, $P_{SA}$, is applied to cavities 138 and 119. This first pressure tends to bias the shuttle piston 118 into the direction or condition of closing off aperture 122, thereby sealing off the flow from servovalve 95A to manifold 132. However, this sealing off is prevented so long as the electric current provided to coils analogous to coils 62A-D in FIG. 2 is sufficient to maintain $P_x$ in FIG. 5 within the operating range. $P_{106}$ (or $P_x$) pushes the shuttle piston 118 to the right, opening aperture 122, and thus under this condition, $P_{106}$ is applied to the head cavity 136. This pressure in the head cavity 136 moves the modulator piston 30 leftward and rightward depending upon the relative value of $P_{106}$ to $P_{SA}$. The pressure in the head cavity 136 is compared with that in the rod cavity 138, taking into consideration the relative areas of the surfaces of the modulator piston 30 in each cavity.

Characterized in still another way, $P_{SA}$ delivered to rod cavity 138 in FIG. 4 tends to bias the modulator piston 30 in a first direction, namely, to the left. Pressure which is supplied by the manifold 132 through conduit 134A tends to urge the modulator piston in a direction opposite to first direction, namely, to the right. The servovalves 95A and B supply fluid pressure to the manifold 132. Each servovalve automatically disconnects itself when the shuttle piston 118 closes off and blocks outlet 124 when $P_x$ falls outside the operating range in FIG. 5. This blockage is tantamount to closing phantom valve 140, which has the result of removing the influence of the servovalve 95A upon the pressure in the manifold 132. The excursion of $P_x$ outside the operating range in FIG. 5 is a predetermined event which triggers the closing of the outlet 124 in FIG. 4. When this event occurs, servovalve 95A is considered to have failed and the blockage of outlet 124 in FIG. 4 inhibits that valve from controlling the modulator piston 30. Instead, the servovalve 95B (if it has not failed) will maintain control of the modulator piston 30.

That is, all of the servovalves (only two are shown in FIG. 4, namely 95A and 95B) continue to remove themselves upon their failure from the manifold 132, leaving the unfailed servovalves to control or influence pressure in the manifold 132.

In another embodiment of the present invention, switches 133A-B are connected to each shuttle piston 118. When the shuttle piston 118 closes off aperture 122, as during a servovalve failure, the switch becomes activated thereby and signals other circuitry (not shown) of this occurrence. Thus, for example, in the case of an STOL aircraft, a single failure of a servovalve 95A in FIG. 4 will not prevent proper operation of the rams 11 and 13, but will provide a signal to the pilot that servovalve 95A has failed. The pilot can turn off the circuit controlling that servovalve if he so desires.

If, during the operation of the embodiment described above, both servovalves 95A and 95B in Figure 4 should fail, fluid flow to and from piston head cavity 136 becomes blocked by seal 120. This locks the modulator piston 30 in its current position. This action may not be desirable in all applications of the present invention, and the following modification can mitigate the effects of this functioning.

Electrical switches 133A and B are activated (i.e., produce a signal) when the shuttle piston 118 translates and blocks the aperture 122. If both switches 133A and B indicate that both shuttle pistons in valves 95A and B have closed, a circuit (not shown) activates a solenoid valve which ports return pressure ($R_A$) to both the piston head cavity 136 and the second cavity 138. This porting allows the second modulator piston 85 alone to control the spool valve and to move modulator piston 30.

In another embodiment of the present invention, more than the two servovalves 95A and B are connected to the manifold 132. Each additional valve is connected identically as valves 95A and B, thus providing multiple redundancy. Assuming there to be four servovalves connected to manifold 132 just as valve 95A is connected, then proper functioning will be maintained until all four valves fail. If a sufficient number of valves is used, the probability of simultaneous failure of them all becomes so small as that, for practical purposes, the probability can be considered to be zero. (The reader will recall that, under these circumstances, the probability of simultaneous failure of the four valves is the product of the individual probabilities. In the case of an individual probability of $10^{-5}$, the probability product would be $10^{-20}$, an extremely small number.)

In the embodiment of FIG. 4, it has been assumed that separate pumps (not shown) supply pressure to sources $P_{SA}$ and $P_{SB}$. In still another embodiment, a shuttle valve (not shown) preferentially selects one of the pumps to supply both $P_{SA}$ and $P_{SB}$, although both pumps are running. In the event of failure of the one pump, the shuttle valve is switched in a manner known in the art, so that the other pump now supplies pressure to all ports (both $P_{SA}$ and $P_{SB}$) in FIG. 4.

The shuttle valve just discussed is one commonly used in aircraft hydraulic systems. This valve returns hydraulic fluid to the same hydraulic system from which the fluid was taken. Of course, the shuttle valve arrangement just described need not be used if the pumps used to provide hydraulic fluid pressure meet adequate standards of reliability.

A servovalve system has been described which provides greater effective redundancy than some prior art systems in the sense that the failure of one servovalve causes only the removal of that valve from operation. The system is also less sensitive to servovalve output pressure differences because it does not use pressure monitors to detect malfunctions. Thirdly, the system allows using a separate driver for each servovalve rather than hooking all four drivers to all four servovalves in series. This reduces the number of coils and wires needed. These features provide a system of lighter weight, lower cost, and higher reliability that the prior art systems of FIGS. 2 and 3.

Numerous modifications and substitutions can be undertaken without departing from the true spirit and scope of the present invention. What is desired to be secured by Letters Patent of the United States is the following.

I claim:

1. A servovalve system comprising:
   a modulator piston which controls fluid pressure applied to a ram piston;
   a biasing means for biasing the modulator piston in a first direction;
   a manifold connected to the modulator piston for supplying fluid pressure to the modulator piston for urging the modulator piston in a second direction opposite the first direction; and a plurality of servovalves connected to the manifold for supplying fluid pressure to the manifold, each servovalve containing means for removing the fluid pressure supplies by each servovalve to the manifold when a predetermined event occurs, but leaving substantially unaffected the fluid pressure supplies by the other servovalves to the manifold.

2. A servovalve system according to claim 1 and further comprising means for varying the pressure supplied by each servovalve to the manifold.

3. A servovalve system according to claim 2 and further comprising means for inducing the pressures supplied by all servovalves to be substantially identical in value.

4. The servovalve system of claim 1, in which each of the servovalves has an operating range in which it supplies fluid pressure to the manifold and each removing means removes the pressure supplied by its respective servovalve when its respective servovalve supplies fluid pressure to the manifold outside the operating range of its respective servovalve.

* * * * *